United States Patent
Berkout

(10) Patent No.: US 10,734,213 B2
(45) Date of Patent: Aug. 4, 2020

(54) INTERMITTENT MASS SPECTROMETER INLET

(71) Applicant: Smiths Detection Inc., Edgewood, MD (US)

(72) Inventor: Vadym Berkout, Rockville, MD (US)

(73) Assignee: Smiths Detection Inc., Edgewood, MD (US)

(*) Notice: Subject to any disclaimer, the term of this patent is extended or adjusted under 35 U.S.C. 154(b) by 105 days.

(21) Appl. No.: 14/908,629

(22) PCT Filed: Jul. 31, 2014

(86) PCT No.: PCT/US2014/049036
§ 371 (c)(1),
(2) Date: Jan. 29, 2016

(87) PCT Pub. No.: WO2015/017612
PCT Pub. Date: Feb. 5, 2015

(65) Prior Publication Data
US 2016/0172177 A1 Jun. 16, 2016

Related U.S. Application Data

(60) Provisional application No. 61/860,781, filed on Jul. 31, 2013.

(51) Int. Cl.
*H01J 49/06* (2006.01)
*G01N 30/72* (2006.01)
(Continued)

(52) U.S. Cl.
CPC ............ *H01J 49/067* (2013.01); *G01N 30/72* (2013.01); *H01J 49/0404* (2013.01); *H01J 49/26* (2013.01); *G01N 1/28* (2013.01); *H01J 49/24* (2013.01)

(58) Field of Classification Search
CPC ...... H01J 49/067; H01J 49/26; H01J 49/0404; H01J 37/252; H01J 49/24; H01J 49/165; H01J 49/107; G01N 1/28; G01N 30/72
See application file for complete search history.

(56) References Cited

U.S. PATENT DOCUMENTS 4,068,122 A   1/1978 Schmidt et al.
4,263,507 A   4/1981 Schmidt
(Continued)

FOREIGN PATENT DOCUMENTS

CN    101641761 A    2/2010
GB      2491484 A   12/2012
(Continued)

OTHER PUBLICATIONS

International Search Report and Written Opinion dated Nov. 10, 2014 for PCT/US2014/049036.
(Continued)

*Primary Examiner* — Brooke Purinton
(74) *Attorney, Agent, or Firm* — Kevin E. West; Advent, LLP

(57) ABSTRACT

An intermittent sample inlet device and methods for use of the intermittent sample inlet device are described that include an orifice plate with an entrance orifice and a rotating skimmer with a skimmer orifice, where the rotating skimmer is disposed between the orifice plate and a vacuum chamber wall. The rotating skimmer rotates so that the skimmer orifice intermittently aligns with the entrance orifice and allows an ion sample to pass through to a mass analyzer.

19 Claims, 7 Drawing Sheets

(51) Int. Cl.
*H01J 49/04* (2006.01)
*H01J 49/26* (2006.01)
*G01N 1/28* (2006.01)
*H01J 49/24* (2006.01)

(56) References Cited

U.S. PATENT DOCUMENTS

| | | | | |
|---|---|---|---|---|
| 4,740,692 | A * | 4/1988 | Yamamoto | H01J 49/162 |
| | | | | 250/282 |
| 6,066,848 | A * | 5/2000 | Kassel | H01J 49/165 |
| | | | | 250/285 |
| 6,657,191 | B2 * | 12/2003 | Park | H01J 49/165 |
| | | | | 250/281 |
| 6,902,938 | B1 * | 6/2005 | Cody | G01N 1/38 |
| | | | | 250/281 |
| 7,743,790 | B2 * | 6/2010 | Howard | F16K 51/02 |
| | | | | 137/630.12 |
| 9,123,523 | B2 * | 9/2015 | Green | H01J 49/0059 |
| 2003/0052269 | A1 * | 3/2003 | Apffel, Jr. | G01N 30/7266 |
| | | | | 250/288 |
| 2003/0106996 | A1 * | 6/2003 | Covey | H01J 49/04 |
| | | | | 250/288 |
| 2004/0011951 | A1 | 1/2004 | Giles et al. | |
| 2005/0194532 | A1 | 9/2005 | Guevremont et al. | |
| 2006/0255261 | A1 | 11/2006 | Whitehouse et al. | |
| 2008/0042055 | A1 * | 2/2008 | Baykut | G01N 27/622 |
| | | | | 250/287 |
| 2011/0309243 | A1 | 12/2011 | Whitehouse | |
| 2012/0104247 | A1 * | 5/2012 | Ogawa | H01J 49/26 |
| | | | | 250/288 |
| 2015/0021469 | A1 * | 1/2015 | Bajic | H01J 49/0454 |
| | | | | 250/282 |

FOREIGN PATENT DOCUMENTS

| | | |
|---|---|---|
| WO | 2012127902 A1 | 9/2012 |
| WO | 2013093517 A1 | 6/2013 |

OTHER PUBLICATIONS

Benedikt, J. et al., "Molecular beam sampling system with very high beam-to-background ratio: The rotating skimmer concept", Review of Scientific Instruments, 80, pp. 055107-1-055107-4 (2009).

CN Office Action dated Dec. 19, 2016 for CN Application No. 201480043606.1.

Extended EP Search Report dated Jan. 26, 2017 for EP Application No. 14831741.5.

* cited by examiner

INTERMITTENT MASS SPECTROMETER INLET

BACKGROUND

Mass spectrometers (MS) operate in a vacuum and separate ions with respect to mass-to-charge ratio. In some embodiments using a mass spectrometer, a sample, which may be solid, liquid, or gas, is ionized. The ions are separated in a mass analyzer according to mass-to-charge ratio and are detected by a device capable of detecting charged particles. The signal from the detector is then processed into the spectra of the relative abundance of ions as a function of the mass-to-charge ratio. The atoms or molecules are identified by correlating the identified masses with known masses or through a characteristic fragmentation pattern.

SUMMARY

An intermittent sample inlet device and methods for use of the intermittent sample inlet device are described that include a conduit (e.g., an orifice plate) with an entrance orifice and a rotating skimmer with a skimmer orifice, where the rotating skimmer is disposed between the conduit and a vacuum chamber wall. The rotating skimmer rotates so that the skimmer orifice intermittently aligns with the entrance orifice and allows an ion sample to pass through to a mass analyzer system and detector. Additionally, an intermittent inlet detection device may include an ion funnel, a second or stationary skimmer, an ion guide, a mass analyzer, a detector, at least one vacuum pump (e.g., a low vacuum pump, a high vacuum pump, etc.). In an implementation, a process for utilizing the intermittent inlet device that employs the techniques of the present disclosure includes producing a sample of ions from an ion source, receiving the sample of ions at a conduit and/or an orifice plate with an entrance orifice, rotating a skimmer disk disposed between the conduit and/or an orifice plate and a vacuum chamber wall, where a skimmer orifice in the rotating skimmer intermittently aligns with the entrance orifice as the rotating skimmer rotates, and transferring the sample of ions thorough the entrance orifice and the skimmer orifice.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference number in different instances in the description and the figures may indicate similar or identical items.

DETAILED DESCRIPTION

Figure 1:
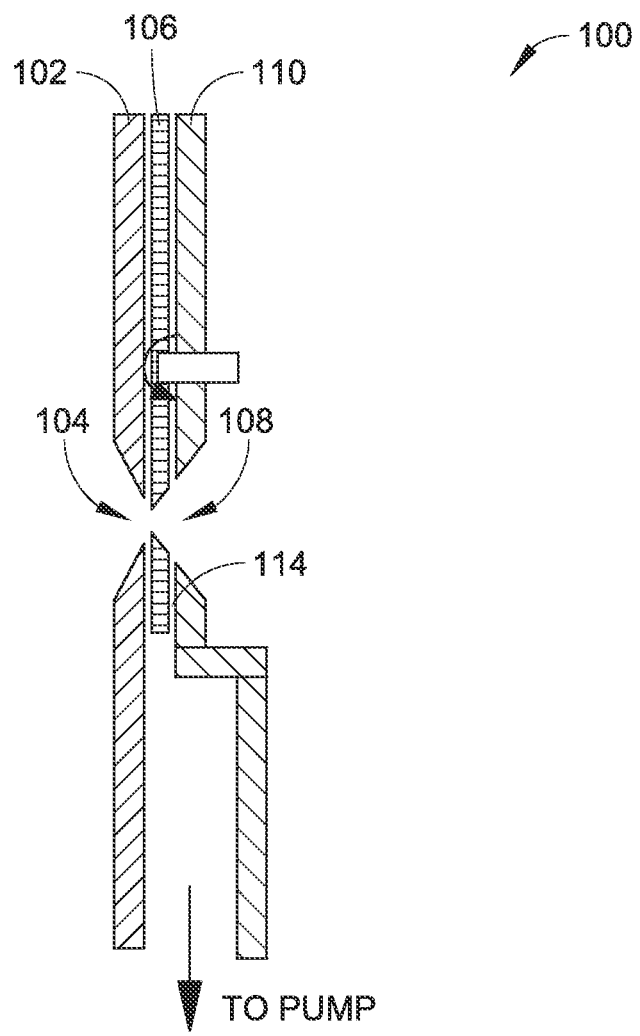
FIG. 1 is a diagrammatic cross-sectional view illustrating an intermittent sample inlet device that includes a rotating skimmer with a skimmer orifice in accordance with an example implementation of the present disclosure.

Mass spectrometers (MS) operate in a vacuum and separate ions with respect to the mass-to-charge ratio. In some embodiments using a mass spectrometer, a sample, which may be solid, liquid, or gas, is ionized and analyzed. The ions are separated in a mass analyzer according to mass-to-charge ratio and are detected by a detector capable of detecting charged particles. The signal from the detector is then processed into the spectra of the relative abundance of ions as a function of the mass-to-charge ratio. The atoms or molecules are identified by correlating the identified masses with known masses or through a characteristic fragmentation pattern.

Portable mass spectrometer systems have limitations on sample introduction methods into a vacuum manifold because of the smaller pumping systems (most commonly effluent from gas chromatography capillary or flow through a permeable membrane are used). The range of analytes which can be efficiently examined is thereby limited by the sample introduction and ionization methods employed (in most cases an electron ionization (EI) is used). To analyze more types of compounds and reduce the burden of sample preparation, atmospheric pressure ionization techniques need to be employed to ionize a sample. A variety of atmospheric pressure ionization methods include electrospray ionization (ESI) (Yamashita, M.; Fenn, J. B., *J. Phys. Chem.* 1984, 88, 4451-4459), atmospheric pressure chemical ionization (APCI) (Carroll, D. I.; Dzidic, I.; Stillwell, R. N.; Haegele, K. D.; Horning, E. C. *Anal. Chem.* 1975, 47, 2369-2373), desorption electrospray ionization (DESI) (Takats, Z.; Wiseman, J. M.; Gologan, B.; Cooks, R. G. Science 2004, 306, 471-473), direct analysis in real time (DART) (Cody, R. B.; Laramee, J. A.; Durst, H. D. Anal. Chem. 2005, 77, 2297-2302), atmospheric pressure Dielectric Barrier Discharge Ionization (DBDI), and electrospray-assisted laser desorption/ionization (ELDI) (Shiea, J.; Huang, M. Z.; Hsu, H. J.; Lee, C. Y.; Yuan, C. H.; Beech, I.; Sunner, J. Rapid Commun. Mass Spectrom. 2005, 19, 3701-3704), etc.

A typical atmospheric pressure ionization interface has a constantly open channel involving a series of differential pumping stages with a capillary or a thin hole of small diameter to allow ions to be transferred into the first stage and a skimmer for access to the second stage. A rough pump is usually used to pump the first region to about 1 Torr and multiple drag and/or turbomolecular pumps or a single pump with split flow are used for pumping the subsequent regions. Ion optical systems, including electrostatic lenses and RF devices, are also used to transmit the ions while the neutrals are pumped away. To maximize the number of ions transferred into the final region for mass analysis, large pumping systems are employed so that larger orifices can be used to pass ions from region to region.

One way to circumvent the pumping speed limitation in portable mass spectrometers was proposed by R. Graham Cooks et al. in U.S. Pat. No. 8,304,718. A discontinuous atmospheric pressure interface (DAPI) consists of two capillaries connected together by a plastic tube. A pinched valve periodically squeezes the plastic tube thus closing the intake flow into the mass spectrometer during a mass analysis step. DAPI was found to have a very limited life-time because pinched plastic tubing loses mechanical integrity over time. Another problem with DAPI is the requirement to keep the plastic tubing near room temperature to maintain its mechanical properties. This creates a problem with contamination when dealing with the introduction of "dirty" environmental samples.

Portable mass spectrometer systems are limited on sample amounts that can be introduced into the vacuum of the mass spectrometer analyzer because of the small pumping system of a portable mass spectrometer system, which is required to be portable. Most commonly effluents from gas chromatography capillary or flow through a permeable membrane are used in portable mass spectrometric systems. These methods of sample introduction limit analytes by volatility as well as the ionization methods that can be employed for ionization in a portable mass spectrometry system—mainly electron impact ionization is used in these instances. In order to analyze a wider class of compounds, atmospheric pressure ionization techniques need to be utilized (e.g., APCI, sESI, etc.). Atmospheric pressure ionization techniques, as well as direct surface ionization techniques, require ion transfer from areas of atmospheric pressure into the vacuum chamber of the mass analyzer. Efficient ion transfer can be realized only with intake flows of at least approximately 0.10 L/min through an entrance orifice or a small capillary. Such flows are not compatible with small pumping systems, such as those in portable mass spectrometry systems.

Accordingly, an intermittent sample inlet device and methods for use of the intermittent sample inlet device are described that include a conduit (e.g., an orifice plate) with an entrance orifice and a rotating skimmer with a skimmer orifice, where the rotating skimmer is disposed between the conduit and a vacuum chamber wall. The rotating skimmer rotates so that the skimmer orifice intermittently aligns with the entrance orifice and allows an ion sample to pass through to a mass analyzer while maintaining a vacuum in the mass analyzer. Additionally, an intermittent inlet detection device may include an ion funnel, a second or stationary skimmer, an ion guide, a mass analyzer, a detector, at least one low vacuum pump, and/or a high vacuum pump. In an implementation, a process for utilizing the intermittent inlet device that employs the techniques of the present disclosure includes producing a sample of ions from an ion source; receiving the sample of ions at a conduit with an entrance orifice; rotating a rotating skimmer disposed between the conduit and a vacuum chamber wall, where a skimmer orifice in the rotating skimmer intermittently aligns with the entrance orifice as the rotating skimmer rotates; and transferring the sample of ions thorough the entrance orifice and the skimmer orifice. A method of ion transfer from high pressure region to lower pressure conditions with reduced gas load for a mass spectrometer pumping system, not having the limitations related to pinch valve design, is provided.

FIG. 1 illustrates an intermittent sample inlet device 100 in accordance with example implementations of the present disclosure. As shown, the intermittent sample inlet device 100 includes a conduit 102 and a rotating skimmer 106. In implementations, the conduit 102 may include an orifice plate (e.g., a plate or wall) that includes an entrance orifice 104. In other implementations, the conduit 102 may include a capillary tube, which may or may not be heated. In embodiments, the conduit 102 may have a constant diameter (e.g., a planar plate or cylinder). The entrance orifice 104 in the conduit 102 may include an orifice designed to let a sample of ions pass through to a rotating skimmer 106 where the rotating skimmer includes a skimmer orifice 108. In embodiments, sizing of the entrance orifice 104 includes dimensions that allow a sample of ions and/or a carrier gas to pass while allowing a vacuum chamber (a portion of the mass spectrometer) to maintain proper vacuum In one implementation, the entrance orifice 104 is disposed in the center of an orifice plate and aligned with a sample input from a sample ionizing source 502. The entrance orifice 104 may be disposed on other locations of the conduit 102 as long as the entrance orifice 104 intercepts a portion of an ion sample, and the ion sample efficiently passes through the conduit 102.

Figure 2:
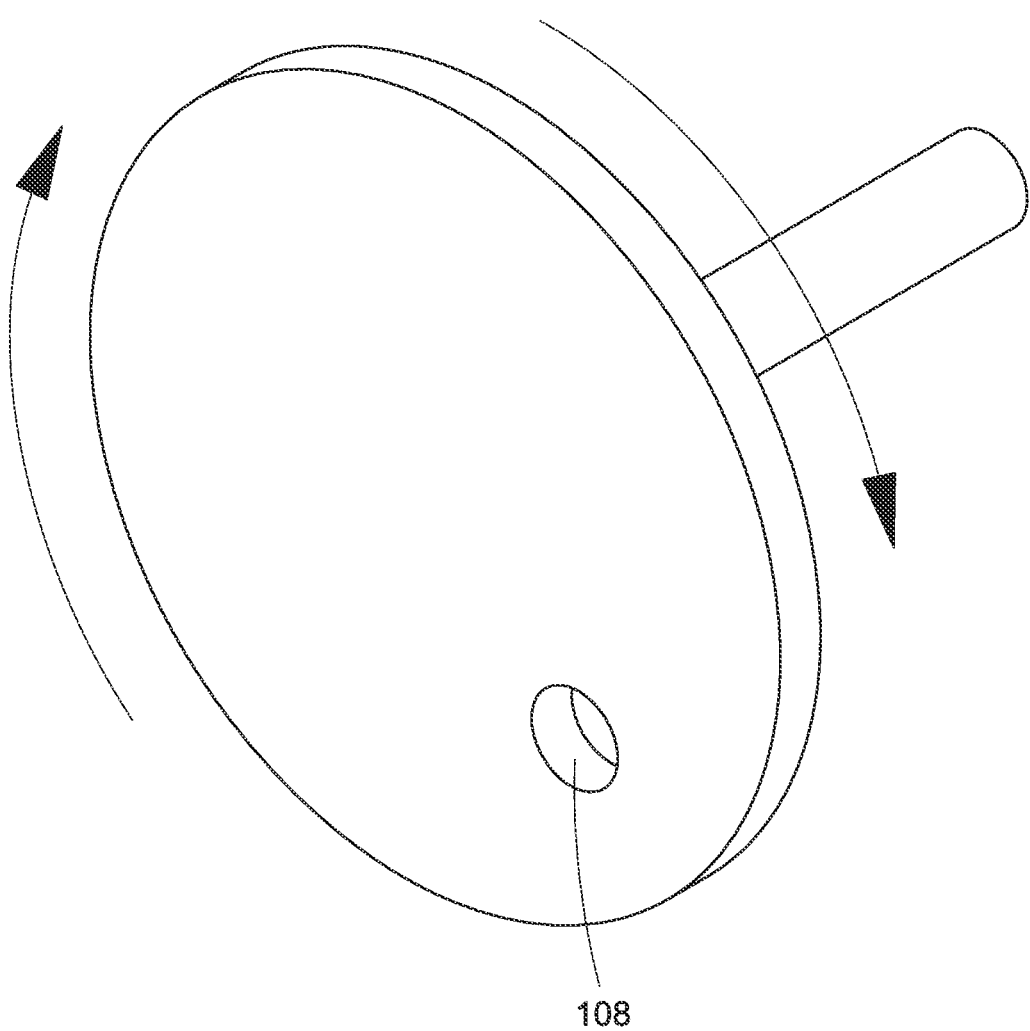
FIG. 2 is a diagrammatic isometric view illustrating a rotating skimmer with a skimmer orifice in accordance with an example implementation of the present disclosure.

As shown in FIGS. 1 and 2, the intermittent sample inlet device 100 includes a rotating skimmer 106 having a skimmer orifice 108. In implementations, the rotating skimmer 106 includes a skimmer disposed between the conduit 102 and a vacuum chamber wall 110, where the rotating skimmer 106 is offset from the conduit 102 (e.g., where the axis of the rotating skimmer 106 has a perpendicular distance from the axis of the conduit 102 and/or entrance orifice 104). As shown in FIG. 2, the rotating skimmer 106 includes a skimmer orifice 108 and is designed to rotate such that the skimmer orifice 108 and the entrance orifice 104 intermittently align. In an embodiment, the skimmer orifice 108 is offset from the center of the rotating skimmer 106 and configured to intermittently align with the entrance orifice 104 as the rotating skimmer 106 rotates. When the skimmer orifice 108 and the entrance orifice 104 are aligned, an ion sample is allowed to pass through the skimmer orifice 108 and the entrance orifice 104 from a sample ionizing source 502 to a mass analyzer system 118 and subsequent detector 504. When the skimmer orifice 108 and the entrance orifice 104 are not aligned, the ion sample and carrier gas is blocked. This intermittent orifice alignment functions to let a sample through to the mass analyzer system 118 while preventing excessive gas flow and maintaining a vacuum. Further, intermittent alignment of the skimmer orifice 108 and the entrance orifice 104 serve to allow a sufficient amount of an ion sample to pass through the skimmer orifice 108 and the entrance orifice 104 while allowing the subsequent mass analyzer system 118 to maintain sufficient vacuum for analysis of the ion sample. In some embodiments, a predetermined gap 114 is designed between the rotating skimmer 106 and the conduit 102 that serves to allow the rotating skimmer 106 to rotate. In these embodiments, the predetermined gap 114 is designed to be as small as possible to prevent gas passing through the predetermined gap 114 into the mass analyzer system 118 while still allowing the rotating skimmer 106 to rotate.

Figure 3:
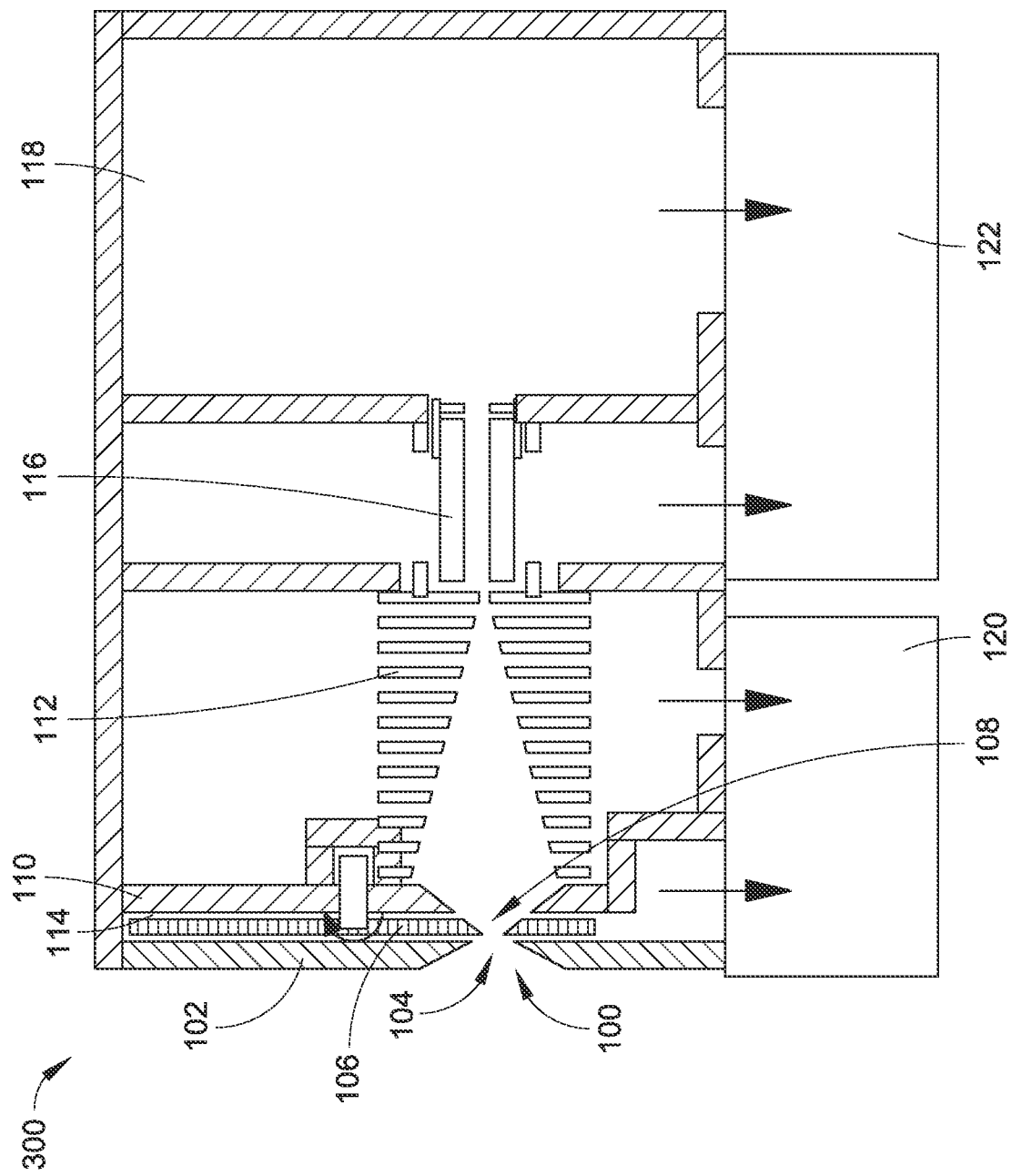
FIG. 3 is a diagrammatic cross-sectional view illustrating an intermittent inlet detection device that includes a rotating skimmer with a skimmer orifice and an ion funnel in accordance with an example implementation of the present disclosure.

One embodiment of an intermittent inlet detection device 300 is illustrated in FIGS. 3 through 6. In some embodiments and as shown in FIG. 3, an intermittent inlet detection device 300 includes an intermittent sample inlet device 100, an ion funnel 112, an ion guide 116, a low vacuum pump 120, a mass analyzer system 118, and a high vacuum pump 122. In implementations, air flow including an ion sample and carrier gas passes through an intermittent sample inlet device 100 and into an ion funnel 112 (R. D. Smith and S. A. Shaffer, U.S. Pat. No. 6,107,628). In implementations, an ion funnel 112 includes an assembly of parallel, coaxially arranged ring-shaped apertured diaphragms with tapering internal diameter separated by narrow intermediate spacers. In these implementations, the diameters of the apertures of the diaphragms gradually taper toward the central exit orifice of the ion funnel 112 into the subsequent chamber (e.g., ion guide chamber, mass analyzer system, etc.). The ion funnel 112 may function to focus the ion beam (or ion sample) into a small conductance limit at the exit of the ion funnel 112. In some embodiments, the ion funnel 112 operates at relatively high pressures (e.g., up to 30 Ton) and thus provides ion confinement and efficient transfer into next vacuum stage (e.g., an ion guide 116, mass analyzer system 118, etc.), which is at a relatively lower pressure. The ion sample may then flow from the ion funnel 112 into an ion guide 116 and/or mass analyzer system 118.

Figure 4:
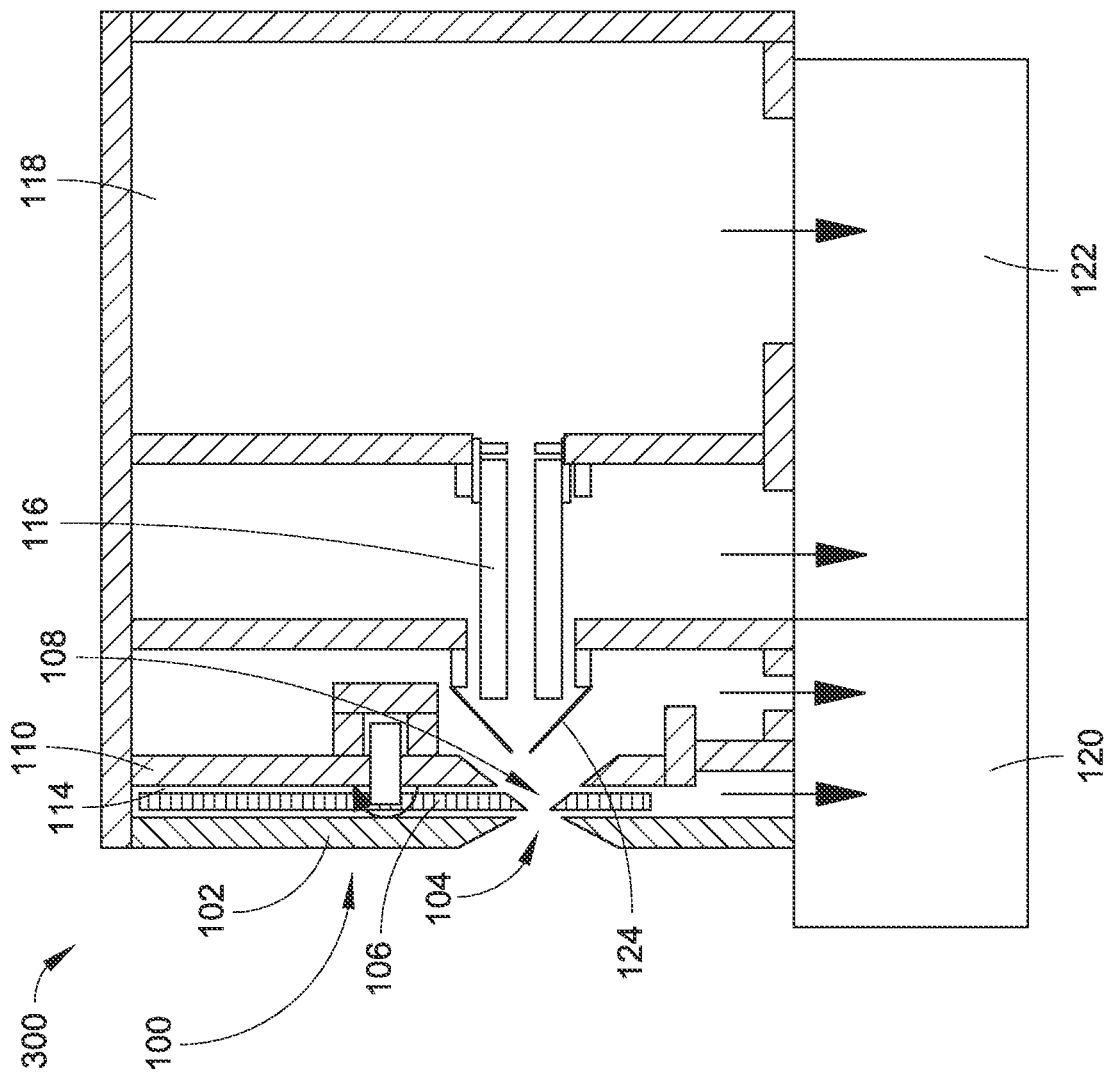
FIG. 4 is a diagrammatic cross-sectional view illustrating an intermittent inlet detection device that includes a rotating skimmer with a skimmer orifice and a stationary skimmer in accordance with an example implementation of the present disclosure.
Figure 5:
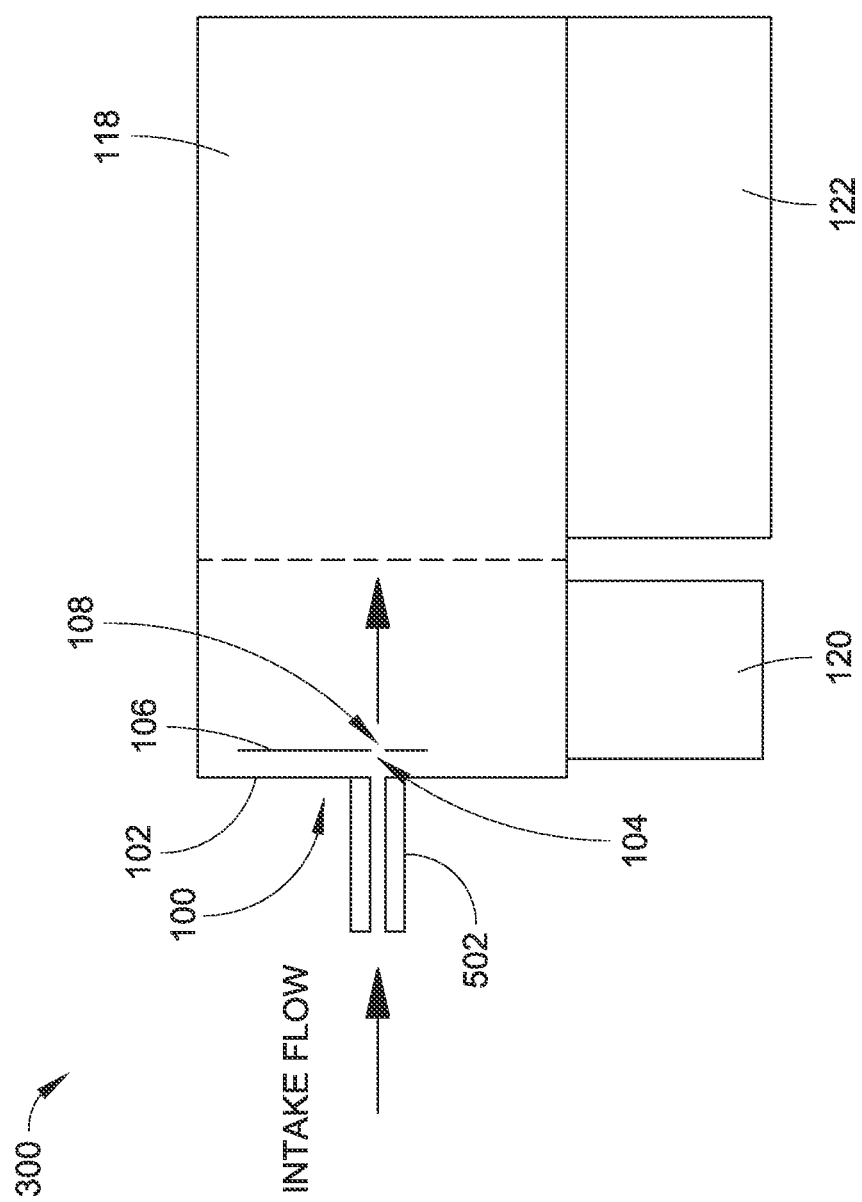
FIG. 5 is a diagrammatic cross-sectional view illustrating an intermittent inlet detection device that includes a rotating skimmer with a skimmer orifice and a capillary tube in accordance with an example implementation of the present disclosure.

As illustrated in FIGS. 3 through 5, an intermittent inlet detection device 300 includes a low vacuum pump 120. A vacuum, at least partially created by a low vacuum pump 120 (e.g., a diaphragm pump), is necessary because it reduces and/or eliminates intermolecular collisions that would otherwise reduce the effectiveness of the intermittent sample inlet device 100 and/or mass analyzer system 118 at separating elements based on their mass-to-charge ratios because molecular collisions may significantly alter the trajectories of ions involved and result in less ions reaching the detector 604. Additionally, the low vacuum pump 120 may serve to reduce the amount of gas passing through the predetermined gap 114. In embodiments, the low vacuum pump 120 is coupled to at least one vacuum chamber of the intermittent inlet detection device 300, where, for example, the rotating skimmer 106 and/or an ion funnel 112 is located. In some implementations, the low vacuum pump 120 may include, for example, a scroll vacuum pump. In one specific embodiment, the low vacuum pump 120 provides a vacuum of approximately up to 30 Torr (e.g., for a vacuum chamber that includes an ion funnel 112) although the low vacuum pump 120 may provide other vacuum pressures as well.

In the embodiment illustrated in FIGS. 3 and 4, an ion guide 116 is adjacent to and downstream from the ion funnel 112. In implementations, the ion guide 116 serves to guide ions from the ion funnel 112 into the mass analyzer 118 while pumping away neutral molecules. In some embodiments, an ion guide 116 includes a multipole ion guide, which may include multiple rod electrodes located along the ion pathway where an RF electric field is created by the electrodes and confines ions along the ion guide axis. In some embodiments, the ion guide 116 operates at up to approximately 100 mTorr pressure, although other pressures may be utilized. Additionally, the ion guide 116 may be followed by a conductance limiting orifice, which may have a smaller diameter than the diameter of the exit orifice of the ion guide 116.

In the embodiment illustrated in FIG. 4, intermittent inlet detection device 300 includes a stationary skimmer 124. In this embodiment, a stationary skimmer 124 may include a skimmer, such as a skimmer cone, with a central orifice that is designed to intercept the center of a spray or jet expansion (e.g., the ion sample) and functions to sample the central portion of the expansion. In this specific embodiment, a stationary skimmer 124 includes a skimmer cone downstream from the intermittent sample inlet device 100 configured to allow a portion of an ion sample through the central orifice into an ion guide 116. In other embodiments, a stationary skimmer 124 may include any structure placed between an ion source and ion detector that is used to separate regions of ion flow or gas flow with low disruption. Additionally, the stationary skimmer 124 may include any number of shapes and/or designs that may efficiently and advantageously intercept jet expansion. In the embodiment shown in FIG. 4, stationary skimmer 124 includes a non-moving cone-shaped skimmer.

In the embodiment illustrated in FIG. 5, intermittent sample inlet device 100 and intermittent inlet detection device 300 includes a capillary tube 502. In embodiments, conduit 102 includes a capillary tube 502 disposed upstream of the entrance orifice 104. In these embodiments, the exit of the capillary tube 502 functions as an entrance for the rotating skimmer 106. When an atmospheric pressure ionization (API) source, such as an electrospray (ES) or atmospheric pressure ionization (APCI) source, is installed on a mass spectrometer system (e.g., intermittent inlet detection device 300), the gas flow from the atmospheric pressure ionization chamber into the vacuum system of the mass spectrometer must be set to match the pumping capacity of the vacuum pumps used. Utilizing a capillary tube is one method used to limit the gas flow from the atmospheric pressure spray chamber into the vacuum system of the mass spectrometer. In some embodiments, capillary tube(s) 502 may be heated to provide thermal energy to the solvated ions passing through them, thus desolvating these ions. In some embodiments, the ion flow may pass through rotating skimmer 106 directly into mass analyzer 118 (e.g., an ion trap).

As shown in FIGS. 3 through 6, intermittent inlet detection device 300 includes a mass analyzer system 118. In implementations, a mass analyzer system 118 includes the component of the mass spectrometer (e.g., intermittent inlet detection device 300) that separates ionized masses based on charge to mass ratios and outputs the ionized masses to the detector 604. Some examples of a mass analyzer system 118 include a quadrupole mass analyzer, a time of flight (TOF) mass analyzer, a magnetic sector mass analyzer, an electrostatic sector mass analyzer, a quadrupole ion trap mass analyzer, etc. In another embodiment, a mass analyzer system 118 utilized in an intermittent inlet detection device 300 may include an ion trap device, which may include multiple electrodes that are used to trap ions in a small volume.

As illustrated in FIGS. 3 through 5, an intermittent inlet detection device 300 includes a high vacuum pump 122. A vacuum, at least partially created by a high vacuum pump 122, is necessary because it reduces and/or eliminates ion-molecule collisions that would otherwise reduce the effectiveness of the mass analyzer 118 at separating elements based on their mass-to-charge ratios because molecular collisions may significantly alter the trajectories of the molecules or ions involved and result in less ions of a desired mass/charge reaching the detector 604. In embodiments, the high vacuum pump 122 is coupled to a vacuum chamber of the intermittent inlet detection device 300 that requires a high vacuum (e.g., low pressure). In an embodiment, the high vacuum pump 122 is coupled to a vacuum chamber including an ion guide 116 (e.g. requiring approximately 100 mTorr). In another embodiment, the high vacuum pump 122 is coupled to a vacuum chamber including a mass analyzer system 118 (e.g., requiring approximately $10^{-3}$ Torr). In some implementations, the high vacuum pump 122 may include, for example, a turbomolecular vacuum pump.

Figure 6:
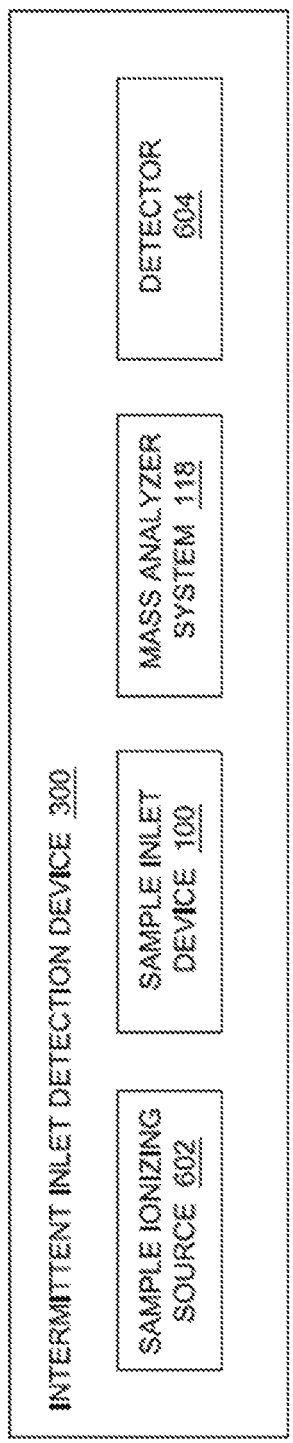
FIG. 6 is a block diagram illustrating an intermittent inlet detection device that includes a sample ionizing source, a sample inlet device, a mass analyzer system, and a detector in accordance with an example implementation of the present disclosure.

FIG. 6 illustrates one example of an intermittent inlet detection device 300 including a sample ionizing source 602, a sample inlet device 100, a mass analyzer system 118, and a detector 604. In embodiments, a sample ionizing source 602 may include a device that creates charged particles (e.g., ions). Some examples of ion sources may include an electrospray ion source, an inductively-coupled plasma, a spark ion source, a corona discharge ion source, a radioactive ion source (e.g., $^{63}$Ni or $^{241}$Am), etc. Additionally, a sample ionizing source 602 may generate ions from a sample at about atmospheric pressure. A sample inlet device 100 includes an intermittent sample inlet device, such as the intermittent sample inlet device 100 described in the preceding paragraphs. Likewise, a mass analyzer system 118 can include systems similar to those described above. A detector 604 can include a device configured to record either the charge induced or the current produced when an ion passes by or hits a surface of the detector 604. Some examples of detectors 604 include an electron multiplier, as well as Faraday cups and ion-to-photon detectors.

Figure 7:
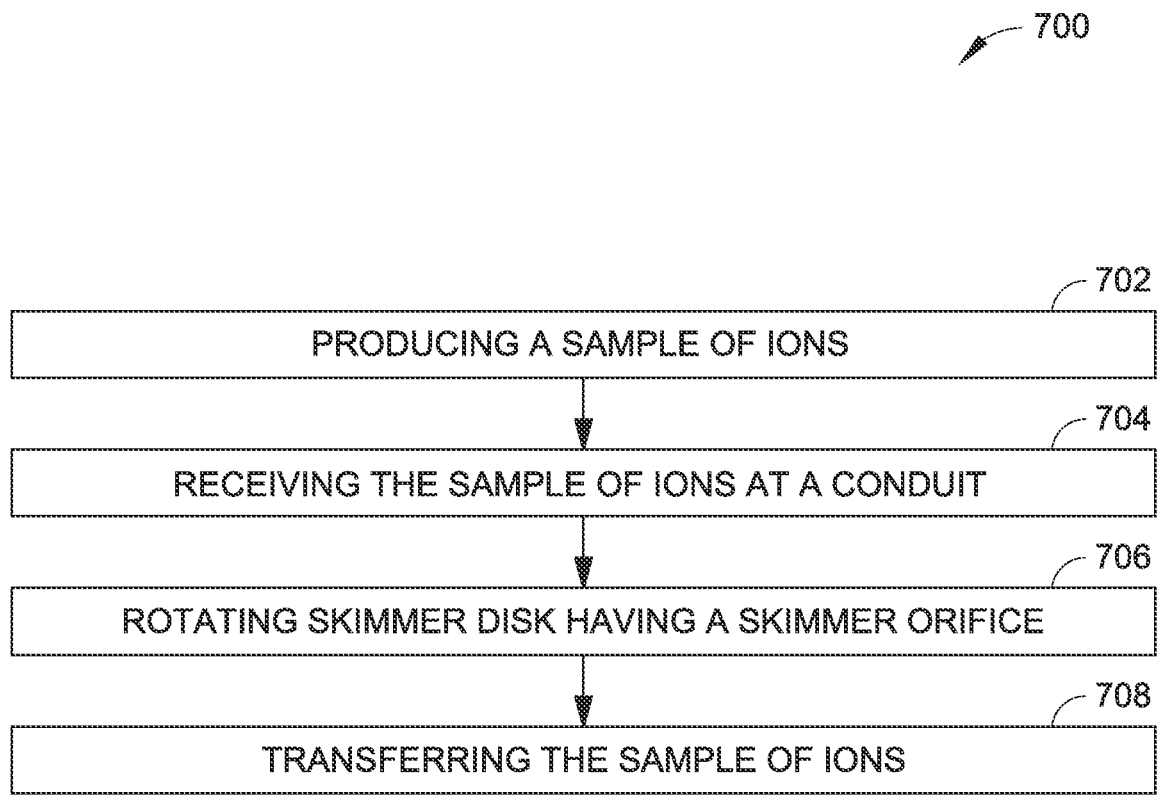
FIG. 7 is a flow diagram illustrating an example process for utilizing the intermittent sample inlet device and intermittent inlet detection device illustrated in FIGS. 1 through 6.

FIG. 7 illustrates an example process 700 that employs the disclosed techniques to employ an intermittent inlet detection device, such as the intermittent inlet detection device 300 shown in FIGS. 1 through 6.

Accordingly, a sample of ions is produced (Block 702). In implementations, producing a sample of ions can include, for example, using an ion source (e.g., electrospray ionization, inductively-coupled plasma, spark ionization, a corona source, a radioactive source (e.g., 63Ni), etc.) or electromagnetic device to produce the ions. In one embodiment, producing a sample of ions includes using a sample ionizing source 602, such as a corona discharge ion source. A corona discharge ion source utilizes a corona discharge surrounding a conductor to produce the sample of ions. In another embodiment, electrospray ionization is used to produce a sample of ions. Electrospray ionization may include applying a high voltage to a sample through an electrospray needle, which emits the sample in the form of an aerosol. The aerosol then traverses the space between the electrospray needle and a cone while solvent evaporation occurs, which results in the formation of ions.

The sample of ions is received at a conduit (Block 704). In implementations, an ion sample is produced by sample ionizing source 602 and received at a conduit 102 or an orifice plate 102. In one embodiment, an ion sample is created using an electrospray source and received at a heated conduit 102, which then travels through the heated conduit 102.

A rotating skimmer is rotated so that the skimmer orifice and the entrance orifice intermittently align (Block 706). In implementations, a rotating skimmer 106 having a skimmer orifice 108 is rotated at a predetermined rate. In one embodiment, a circular rotating skimmer 106 is rotated at a rate (e.g., a few hertz) such that the skimmer orifice 108 in the rotating skimmer 106 intermittently aligns with an entrance orifice 104, through which the ion sample in the conduit 102 passes. Rotating the rotating skimmer 106 at a predetermined rate allows a sufficient ion sample to pass from the sample ionizing source 602 to the mass analyzer system 118 while allowing the low vacuum pump 120 and the high vacuum pump 122 to maintain a sufficient vacuum.

A sample of ions is transferred through the rotating skimmer and skimmer orifice (Block 708). In implementations, the ion sample travels through the skimmer orifice 108 as the rotating skimmer 106 rotates at a predetermined rate. In some implementations, an intermittent inlet detection device 300 utilizes a drift gas, which may include a gas pumped through the intermittent inlet detection device 300 for moving the ions from the sample ionizing source 602 to the detector 604. In one embodiment, a sample of ions is transferred into an ion trapping device, where the operation of the ion trapping device is synchronized with the moment when the skimmer orifice 108 is aligned with entrance conduit (or entrance orifice 104).

Although the invention has been described in language specific to structural features and/or methodological acts, it is to be understood that the invention defined in the appended claims is not necessarily limited to the specific features or acts described. Although various configurations are discussed the apparatus, systems, subsystems, components and so forth can be constructed in a variety of ways without departing from this disclosure. Rather, the specific features and acts are disclosed as example forms of implementing the claimed invention.

What is claimed is:

1. A mass spectrometry sample inlet device for transferring ions at near atmospheric conditions, comprising:
a sample inlet configured to receive an ion sample from a sample ionizing source, wherein the ionizing source generates ions from a sample at atmospheric pressure, the sample inlet including
a rotating skimmer, and
a conduit for transferring sample ions from the ionizing source to the rotating skimmer, the conduit comprising a capillary or an orifice plate, wherein the rotating skimmer is disposed between the conduit and a region at reduced pressure, the region at reduced pressure comprising a vacuum chamber, where the conduit does not extend into the vacuum chamber, and the rotating skimmer is disposed at an entrance through a wall of the vacuum chamber to separate a region at about atmospheric pressure from the region at reduced pressure, where the rotating skimmer includes a skimmer orifice configured to intermittently align with the conduit as the rotating skimmer rotates.

2. The mass spectrometry sample inlet device of claim 1, wherein the conduit comprises an orifice plate including an entrance orifice.

3. The mass spectrometry sample inlet device of claim 1, wherein the conduit comprises a capillary.

4. The mass spectrometry sample inlet device of claim 3, wherein the skimmer orifice is larger than the exit diameter of the capillary.

5. The mass spectrometry sample inlet device of claim 3, wherein the capillary is heated.

6. The mass spectrometry sample inlet device of claim 1, wherein ions are transferred into an ion trapping device.

7. The mass spectrometry sample inlet device of claim 6, wherein the ion trapping device comprises an ion funnel.

8. The mass spectrometry sample inlet device of claim 6, wherein the operation of the ion trapping device is synchronized with the moment when rotating skimmer orifice is aligned with the conduit.

9. The mass spectrometry sample inlet device of claim 6, wherein ion sample flow after the skimmer orifice is further restricted by a stationary skimmer.

10. The mass spectrometry sample inlet device of claim 9, wherein ions are transferred into the ion trapping device after the stationary skimmer.

11. The mass spectrometry sample inlet device of claim 10, wherein the operation of the ion trapping device is synchronized with the moment when the rotating skimmer orifice is aligned with the conduit.

12. The mass spectrometry sample inlet device of claim 1, wherein the rotating skimmer is offset from the conduit.

13. The mass spectrometry sample inlet device of claim 1, wherein the rotating skimmer has multiple skimmer orifices.

14. The mass spectrometry sample inlet device of claim 2, wherein the skimmer orifice is larger than the entrance orifice.

15. The mass spectrometry sample inlet device of claim 1, wherein the skimmer orifice is circular.

16. The mass spectrometry sample inlet device of claim 1, wherein the skimmer orifice is offset from the rotating skimmer.

17. A mass spectrometry system, comprising:
a sample ionizing source;
a sample inlet configured to receive an ion sample from the sample ionizing source, wherein the ionizing source generates ions from a sample at atmospheric pressure, the sample inlet including a rotating skimmer, and a conduit for transferring sample ions along a flow path from the ionizing source to the rotating skimmer, the conduit comprising a capillary or an orifice plate, wherein the rotating skimmer is disposed between the conduit and a region at reduced pressure, the region at reduced pressure comprising a vacuum chamber, where the conduit does not extend into the vacuum chamber and the rotating skimmer is disposed at an entrance through a wall of the vacuum chamber to separate a region at about atmospheric pressure from the region at reduced pressure, where the rotating skimmer includes a skimmer orifice configured to intermittently align with the conduit as the rotating skimmer rotates;
a mass analyzer system including a vacuum chamber; and
a detector.

18. The mass spectrometry system of claim 17, wherein the skimmer orifice is offset from the rotating skimmer.

19. The mass spectrometry sample inlet device of claim 2, wherein the orifice plate and the rotating skimmer define a gap therebetween, the gap being designed to allow the rotating skimmer to rotate yet help prevent gas from passing through the gap and into a corresponding mass analyzer system.

* * * * *